Patented Oct. 8, 1940

2,217,631

UNITED STATES PATENT OFFICE 2,217,631

METHOD OF PRODUCING SOFT SYNTHETIC RUBBERLIKE MATERIALS

William D. Wolfe, Cuyahoga Falls, Ohio, assignor to Wingfoot Corporation, Wilmington, Del., a corporation of Delaware No Drawing. Application October 11, 1938, Serial No. 234,409

13 Claims. (Cl. 260—84)

This invention relates to plastic masses having useful properties and to methods of preparing the same. More particularly, it relates to copolymers which are softer and more tacky than those ordinarily obtained.

Plastic masses having various useful characteristics, some of them resembling rubber in their properties, have been prepared by polymerizing a mixture of two unsaturated compounds, the copolymers having properties which are usually not attainable by the polymerization of a single chemical compound. The present invention concerns a method by which the properties of such copolymers may be modified so as to increase the softness and tackiness of the resulting product. Such soft, tacky bodies are useful in cements, adhesives, and the like.

The improved compositions are prepared by copolymerizing a butadiene with vinyl cyanide or vinyl benzene, the butadiene compound being butadiene itself, dimethyl butadiene, isoprene and others. Copolymers prepared from these monomers may be modified, in accordance with the practice of the invention, by adding to the mixture before polymerization, a small quantity of a compound of the general formula

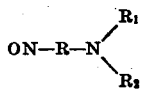

where R is an aromatic radical and R₁ and R₂ are aliphatic or aliphatic-aromatic radicals or hydrogen, at least one aliphatic or aliphatic-aromatic group being present. The modifier is, accordingly, a secondary or a tertiary aromatic amine in which the aromatic ring carries a nitroso substituent. Preferably, tertiary amines are used.

Among the modifiers which may be added to the monomeric mixture in varying amounts to soften the product may be mentioned p-nitroso dimethyl aniline, p-nitroso methyl aniline, p-nitroso diethyl aniline, p-nitroso ethyl aniline, p-nitroso benzyl aniline, p-nitroso methyl ethyl aniline, p-nitroso methyl butyl aniline and p-nitroso methyl benzyl aniline. Of these, p-nitroso dimethyl aniline is preferred.

In carrying out the invention, butadiene and vinyl cyanide or butadiene and vinyl benzene (styrene) are placed in sealed glass bombs, the proportions of the monomeric constituents varying from about 25–75% of the butadiene and, correspondingly, from about 75–25% of the vinyl benzene or vinyl cyanide. The polymerization is conducted in an aqueous emulsion containing sodium oleate and a polymerizing catalyst plus a promoter. Carbon tetra chloride and sodium perborate may be present, for example. The polymerization will usually be conducted at a temperature in the neighborhood of 50° C. although this may be raised or lowered somewhat, a temperature as high as 80° C. being employed in some instances. The time necessary for complete polymerization will, of course, vary, but usually several days is necessary.

The nitroso anilines are added in amount from .5 to 5% of the total monomer present. That is to say, the amount of modifier used is based on the total weight of the butadiene and the vinyl compound being polymerized. The character of the polymer obtained will vary in proportion to the amount of modifier present as indicated by the following tabulation of results obtained when nitroso dimethyl aniline was added in varying amounts to a butadiene-vinyl cyanide and to a butadiene-vinyl benzene mixture.

| p-Nitroso di-me-aniline | Character of polymer |
|---|---|
| 5.0% of the monomers | Viscous, sticky tar. |
| 2.5 | Very soft, tacky solid. |
| 1.25 | Moderately soft and tacky. |
| 0.62 | Soft, barely tacky. |
| None | Firm, non-tacky. |

It will be noted that the control, in which no modifier was present, gave a firm, non-tacky polymer, whereas 5% of the modifier yielded a viscous sticky tar. Intermediate amounts gave polymers of progressively increasing tackiness as the amount of modifier was increased. It is thus possible to obtain a polymer which is a plastic composition having any desirable softness and tackiness, as may be desired in an adhesive or cement. The results obtained are approximately the same, for the amount of modifier present, whether a butadiene-vinyl cyanide polymer or a butadiene-vinyl benzene polymer is treated.

The invention is not limited to the examples disclosed but is generally applicable to products obtainable by the copolymerization of a butadiene compound and a vinyl cyanide or a vinyl benzene. Also, the p-nitroso dimethyl aniline used in the tests described may be replaced by other nitroso aromatic N-aliphatic amines, such as one of those mentioned above or others of the same class. It is intended, then, that the patent shall cover, by suitable expression in the appended claims, all features fo patentable novelty residing in the invention.

What I claim is:

1. A method of preparing a plastic material which comprises polymerizing a mixture of a butadiene and a monomer from the group consisting of vinyl cyanide and vinyl benzene in the presence of a compound having the general formula

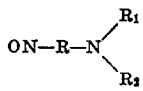

where R is a benzene radical and R₁ and R₂ are selected from the group consisting of aliphatic and aliphatic-aromatic radicals and hydrogen, at least one of the radicals aliphatic and aliphatic-aromatic being present.

2. A method of preparing a plastic material which comprises polymerizing a mixture of a butadiene and a monomer from the group consisting of vinyl cyanide and vinyl benzene in the presence of a nitroso benzene N-aliphatic amine.

3. A method of preparing a plastic material which comprises polymerizing a mixture of a butadiene and a monomer from the group consisting of vinyl cyanide and vinyl benzene in the presence of a nitroso phenyl N-alkyl secondary amine.

4. A method of preparing a plastic material which comprises polymerizing a mixture of a butadiene and a monomer from the group consisting of vinyl cyanide and vinyl benzene in the presence of a nitroso secondary aromatic amine in which the amino group is substituted by an aliphatic radical having a phenyl substituent.

5. A method of preparing a plastic material which comprises polymerizing a mixture of a butadiene and a monomer from the group consisting of vinyl cyanide and vinyl benzene in the presence of a nitroso benzene N-dialkyl tertiary amine.

6. A method of preparing a plastic material which comprises polymerizing a mixture of a butadiene and a monomer from the group consisting of vinyl cyanide and vinyl benzene in the presence of a nitroso tertiary phenyl amine in which the amino group is substituted by two alkyl groups having each an aryl substituent.

7. A method of preparing a plastic material which comprises polymerizing a mixture of butadiene and a monomer from the group consisting of vinyl cyanide and vinyl benzene in the presence of a nitroso phenyl N-dialkyl tertiary amine.

8. A method of preparing a plastic material which comprises polymerizing a mixture of butadiene and a monomer from the group consisting of vinyl cyanide and vinyl benzene in the presence of a p-nitroso dialkyl tertiary phenyl amine.

9. A method of preparing a plastic material which comprises polymerizing a mixture of butadiene and a monomer from the group consisting of vinyl cyanide and vinyl benzene in the presence of p-nitroso dimethyl aniline.

10. A method of preparing a plastic material which comprises polymerizing a mixture of butadiene and vinyl cyanide in the presence of about 0.5 to 5% on the total monomers present of p-nitroso dimethyl aniline.

11. A method of preparing a plastic material which comprises polymerizing a mixture of butadiene and vinyl cyanide in the presence of p-nitroso dimethyl aniline.

12. A method of preparing a plastic material which comprises polymerizing a mixture of a butadiene and a monomer from the group consisting of vinyl cyanide and vinyl benzene in a medium containing an emulsifying agent and a polymerizing catalyst in the presence of about 0.5 to 5% on the total monomer present of a nitroso aromatic N-aliphatic tertiary amine of the benzene series.

13. A method of preparing a plastic material which comprises polymerizing a mixture of butadiene and vinyl cyanide in an emulsion containing sodium oleate and a polymerizing catalyst in the presence of about 1¼% on the total monomer present of pi-nitroso dimethyl aniline.

WILLIAM D. WOLFE.